United States Patent
Shida et al.

(10) Patent No.: US 6,881,051 B2
(45) Date of Patent: Apr. 19, 2005

(54) MOLD FOR INJECTION MOLDING OF DISC SUBSTRATE

(75) Inventors: Noriyoshi Shida, Saitama (JP); Keiji Suga, Saitama (JP); Tetsuya Imai, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/810,228

(22) Filed: Mar. 19, 2001

(65) Prior Publication Data

US 2001/0026817 A1 Oct. 4, 2001

(30) Foreign Application Priority Data

Mar. 24, 2000 (JP) ........................................ 2000-083496

(51) Int. Cl.⁷ .............................................. B29C 45/20
(52) U.S. Cl. ...................... 425/569; 425/567; 425/810; 249/111
(58) Field of Search .............................. 425/567, 569, 425/810; 249/111; 264/106, 107

(56) References Cited

U.S. PATENT DOCUMENTS

| | | | |
|---|---|---|---|
| 4,622,001 A | 11/1986 | Bright et al. ............... | 425/549 |
| 4,666,396 A | 5/1987 | Shaw ......................... | 425/549 |
| 5,560,939 A | * 10/1996 | Nakagawa et al. ......... | 425/139 |
| 5,593,710 A | * 1/1997 | Asai ........................... | 425/552 |
| 5,705,105 A | * 1/1998 | Inoue ......................... | 264/107 |

FOREIGN PATENT DOCUMENTS

| | | | |
|---|---|---|---|
| JP | 8-281737 | * 10/1996 | |
| WO | WO 00/46008 | 8/2000 | |

* cited by examiner

Primary Examiner—James P. Mackey
Assistant Examiner—Donald Heckenberg
(74) Attorney, Agent, or Firm—Morgan Lewis & Bockius LLP (57) ABSTRACT

A conduction member having conduction path for injecting molten molding material within a mold space is fitted to one of a pair of mold bodies which form the disc-shaped mold space. A first heat suppressing member for suppressing heat within the conduction path from being transmitted to the one of the mold bodies is disposed between the conduction member and the one of the mold bodies. Further, a second heat suppressing member is disposed at a position opposite to the first heat suppressing member at the time of mold-clamping the pair of the mold bodies.

3 Claims, 4 Drawing Sheets

MOLD FOR INJECTION MOLDING OF DISC SUBSTRATE

BACKGROUND OF THE INVENTION

1. Field of the Invention

The present invention relates to a mold for injection molding which is used at the time of injection molding the disc substrate of an optical disc.

2. Related Art

An optical disc as the representative of a CD (compact disc) etc. is configured in a manner that a reflection film and a protection film are laminated on a disc-shaped transparent substrate (hereinafter such a transparent substrate is called as a disk substrate) having a recording surface on which a pit sequence with recording information such as music information, image information etc. is transferred. The recording information recorded on the optical disc thus configured is optically read by irradiating an optical beam on the recording surface from the disc substrate side and receiving a reflection beam reflected from the pit sequence on the recording surface.

Thus, the disc substrate is required to be uniform in its optical characteristics such as an optical transmittance, a refractive index etc. To this end, amorphous plastic material such as PC (polycarbonate), PMMA (polymethyl methacrylate) which is transparent and easy to obtain a uniform refractive index is employed as molding material. Such molding material is subjected to the molding process by the injection molding apparatus using the mold for injection molding to thereby form a disc substrate.

Figure 4:
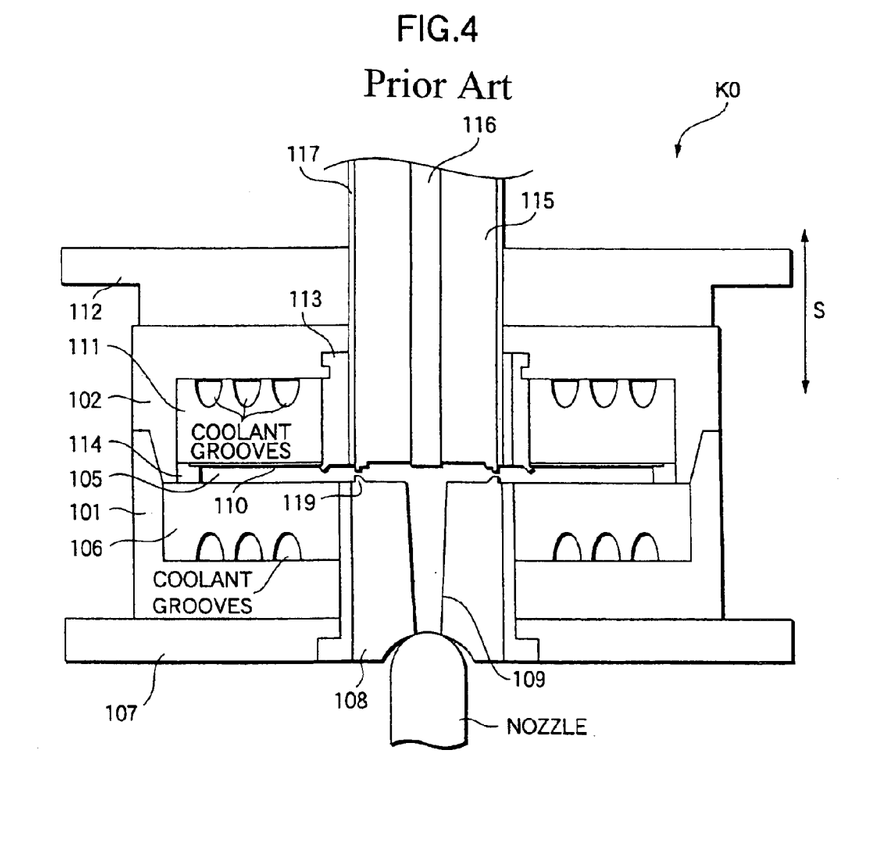
FIG. 4 is a sectional view showing the schematic diagram of the mold K0 of an injection molding apparatus which forms the disc substrate of a CD.

FIG. 4 is a sectional view showing the schematic diagram of a mold K0 of the injection molding apparatus which molds the disc substrate of a CD. As shown in this figure, such mold K0 of the conventional apparatus includes a pair of a fixed mold body 101 and a movable mold body 102.

The fixed mold body 101 and the movable mold body 102 are subjected to the mold clamping in a manner that the mold forming surfaces thereof are opposed to each other to thereby define a mold space 105 of the substrate to be molded.

The fixed mold body 101 includes a fixed mold mirror surface board 106 of a disc shape which forms one surface of the disc substrate to be molded, and is fixed by means of a screw etc. to a not-shown fixed side die plate of the main body of the injection molding apparatus through an attachment mold board 107. A tubular spool bush 108 is passed through the fixed mold mirror surface board 106 and inserted in the center portion within the fixed mold mirror surface board 106. The spool bush 108 is configured as a mold which is exchangeable and provided separately from the fixed mold mirror surface board 106. The spool bush is formed by metal material of generally used SUS system like the fixed mold body 101 and the body 02. A spool 109 for conducting the molding material to the mold space 105 is provided within the spool bush 108. The fixed mold body 101 is fixed by a not-shown holding member so that the injection hole of the nozzle of a not-shown injection mechanism for injecting the molding material coincides with the conduction hole of the spool 109. The spool 109 forms a conduction path for conducting molten molding material injected from the nozzle within the mold space 105.

The movable mold body 102 is provided with a board of a disc shape having the other surface of the disc substrate to be molded, that is, the surface to which a stamper 110 for forming pits carrying recording information is attached. The movable mold body is fixed by means of screws etc. to a not-shown movable side die plate through an attachment mold board 112. A tubular inner peripheral clamp 113 constituting a part of the movable mold body 102 and an annular-shaped outer peripheral clamp 114 are provided at the portions corresponding to the inner periphery and the outer peripheral edge portion of the stamper 110 on the mold forming surface of the movable mold mirror surface board 111, respectively. The inner peripheral clamp 113 has an annular projection portion of an almost rectangular shape in section which protrudes within the mold space 105. The projection portion presses the inner peripheral portion of the stamper 110 against the movable mold mirror surface board 111 and fixes thereto. The outer peripheral clamp 114 has a mold forming surface for defining the outer peripheral edge portion of the substrate to be molded. The stamper 110 is attached to the movable mold mirror surface board 111 by the inner peripheral clamp 113 and the outer peripheral clamp 114 to thereby form a part of the mold forming surface of the movable mold mirror surface board 111.

As shown in FIG. 4, coolant grooves are provided within each of the movable mold mirror surface board 111 and the fixed mold mirror surface board 106. A tubular punch 115 is provided at the center portion of the inner periphery of the movable mold mirror surface board 111 so as to be surrounded by the inner peripheral clamp 113 and freely movable in the direction shown by an arrow S in the figure. The tip portion of the punch 115 forms a part of the mold forming surface. That is, in this case, the tip portion of the punch forms a portion corresponding to the center hole of the substrate which is formed by cooling and solidifying the molten molding material that is conducted and filled within the mold space 105.

The punch 115 is coupled to the output shaft of an oil pressure cylinder mechanism (not shown), whereby the punch is driven in the direction shown by the arrow S. Thus, the punch 115 is driven in the direction shown by the arrow S after the substrate is molded within the mold space 105, so that the tip end portion of the punch can perforate the substrate to thereby punch the portion corresponding to the center hole of the substrate.

An eject pin 116, for separating from the punch 115 the portion corresponding to the center hole of the substrate punched by the punch 115, is provided within the punch 115 so as to reciprocally move freely in the direction shown by the arrow S. The eject pin 116 is also driven by the not-shown oil pressure cylinder mechanism. These mechanisms form a cutting mechanism constituting a part of the movable mold body 102.

An annular ejector 117 constituting a part of the movable mold body 102 is provided between the inner peripheral clamp 113 and the punch 115. The ejector 117 serves to push the substrate thus molded and exfoliate from the movable mold mirror surface board 111. The ejector is freely movable in the direction shown by the arrow S and also driven by the not-shown oil pressure cylinder mechanism.

On the other hand, at the tip end portion of the spool bush 108 provided so as to penetrate the center of the fixed mold mirror surface board 106 of the fixed mold body 101, a die portion 119 constituting a part of the mold forming portion is formed so as to oppose to the punch 115 of a mold releasing mechanism. The portion 119 serves to punch the center hole of the substrate in cooperation with the tip end portion of the punch 115. A space formed among the die portion 119 of the spool bush 118, the tip end portion of the spool bush inside the die portion 119 and the tip end portion of the punch 115 constitutes a runner and a gate serving as a fluid path for conducting the molten molding material injected from the spool 109 into the mold space 105.

Next, the operation of the injection molding apparatus using the mold K0 will be explained.

In the injection molding apparatus, at first, in order to make the temperature distribution uniform within the mold space 105 formed by putting the fixed mold body 101 and the movable mold body 102 together to thereby smoothly flow the molten molding material therein, coolant material such as water, oil etc. which is adjusted so as to have a predetermined temperature equal to or lower than the heat deformation temperature of the molten molding material injected into the mold space 105 is circulated within the coolant grooves of the fixed mold body and the movable mold body so as to preliminarily heat the mold space.

When the mold K0 is kept at the predetermined temperature, then, the fixed mold body 101 and the movable mold body 102 are subjected to the mold clamping. Thereafter, as the injection process, the pressurized molten molding material is injected into the spool 109 from the nozzle of the injection mechanism coupled to the spool 109, then injected within the mold space 105 held at the predetermined temperature in a short time and filled therein. Thus, the molding material is cooled and solidified at a temperature less than the heat deformation temperature in a state where the mold K0 is kept in the mold clamping state.

In this case, since the temperature within the mold space 105 is kept at the predetermined temperature, the molten molding material just after being filled within the mold space 105 shrinks in its high-polymer chain and so solidifies at the temperature equal to or lower than the heat deformation temperature. As a result, since the mold K0 is cooled forcedly in a short time, the molten molding material filled within the mold space 105 is cooled rapidly and so solidified in a disc shape in a state that the pit shapes of the stamper 110 are transferred to the molding material.

In this case, since the molten molding material at the portion corresponding to the inner peripheral side portion from the center hole of the substrate having been filled in the fluid path such as the runner and the gate communicating with the mold space 105 is also cooled and solidified simultaneously, the inner peripheral side portion from the center hole of the substrate is formed in a state being coupled to the disc shape portion. The injection molding apparatus pulls out the center hole portion of the solidified substrate by the operation of the cutting mechanism to form the center hole of the disc substrate.

In this manner, the disc substrate is formed.

In this manner, according to the injection molding apparatus for a disc substrate, at each molding cycle of the substrate, the disc substrate is formed in a manner that the pressurized molten molding material is injected and filled in a short time within the mold space 105 of the preliminarily heated mold K0 to thereby solidify the molten molding material. In this respect, each of the spool bush and the punch is set to a temperature lower than that of the fixed type mold mirror surface board by a not-shown cooling mechanism.

(Problems that the Invention is to Solve)

However, as described above, in the mold K0, since the spool bush 108 for conducting the molten molding material within the mold space 105 is inserted so as to penetrate the center of the fixed mold mirror surface board 106, and at the time of the molding injection of the substrate, heat radiated from the molten molding material sequentially injected into the spool 109 from the nozzle of the injection mechanism in the injection process is transmitted to the spool bush 108 and thereafter sequentially transmitted to the fixed mold mirror surface board 106 adjacent to the spool bush 108. As a result, the portion adjacent to the spool bush 108 of the fixed mold mirror surface board 106 which forms the one surface of the substrate becomes higher in temperature than other portion of the fixed mold mirror surface board 106 and the movable mold mirror surface board 111.

Thus, the portion adjacent to the spool bush 108 of the fixed mold mirror surface board 106 becomes lower in the decreasing rate of the temperature as compared with the other portion of the fixed mold mirror surface board 106 and the movable mold mirror surface board 111. In other words, the temperature distribution within the mold does not become uniform.

As a result, in the substrate, since the portion near the center hole of the substrate on the mold forming surface side formed by the movable mold mirror surface board 111 is molded in a state that the temperature of this portion is kept higher than that of other molding surface including the molding surface on the opposite side, this portion is molded until the high-polymer chain thereof is sufficiently shrunk. That is, the substrate is molded in the same configuration as the mold space 105 while remaining much residual stress near the center hole of the substrate on the mold forming surface side molded by the movable mold mirror surface board 111.

In this manner, since the residual stress becomes asymmetrical between the fixed mold mirror surface board 106 side and the movable mold mirror surface board 111 side, in the disc substrate thus molded, the surface on the fixed mold mirror surface board 106 side on which much residual stress distortion is held just after the molding shrinks gradually with much time longer than the opposite side, that is, the surface on the movable mold mirror surface board 111 side. Thus, there may arises a large warp in the disc radial direction.

When a pickup reads, from the inner periphery side to the outer periphery side by means of a laser beam, the recorded information on the information recording surface of an optical disc which is formed by a disc substrate with such a large warp, the objective lens of the pickup inclines relatively with respect to the disc substrate in accordance with the degree of the warp. Thus, the optical axis of the laser beam incident on the disc substrate inclines from the direction perpendicular to the disc substrate. This inclined angle from the direction perpendicular to the disc substrate (tilt angle) becomes larger in accordance with the degree of the warp at the each radial position of the disc substrate. When the tilt angle of the incident beam becomes larger, there arises in the reflection beam coma aberration having the magnitude according to the tilt angle. Thus, there arises a problem that it is difficult to accurately read recorded information at the largely warped position of the disc substrate of the optical disc.

The coma aberration becomes larger depending on the magnitude of the NA (numerical aperture) of the objective lens of the pickup and the wavelength of the laser beam. Thus, when reading a reflection beam from pits formed on the disc substrate of a DVD etc. on which information is recorded with a higher density, the tilt margin of the pickup, that is, the allowable range of the tilt angle of the incident beam of the pickup with respect to the disc substrate becomes smaller. As a result, pickups used for high-density recording discs such as DVDs are required to adjust the radial skew in a restricted range as compared with pickups for CDs.

SUMMARY OF THE INVENTION

Accordingly, the invention has been made in view of the aforesaid problems, and an object of the invention is to provide a mold for injection molding of a disc substrate which can mold the substrate without causing the asymmetry of residual stresses that becomes a cause of the warp of the substrate.

(Means for Solving the Problems)

In order to solve the aforesaid problem, the invention of a first aspect is arranged in a manner that in a mold for injection molding of a disc substrate including a pair of mold bodies which are disposed in a manner that circular-shaped mold forming surfaces thereof are opposed to each other to form a disc-shaped mold space therebetween, and a conduction means which is fitted to one of the pair of mold bodies so as to communicate with outside through a conduction path for conducting molten molding material injected from outside into the disc-shaped mold space, the mold for injection molding of a disc substrate is characterized in that a first heat suppressing means for suppressing heat within the conduction path from being transmitted to the one of the pair of mold bodies is disposed between the conduction means and the one of the pair of mold bodies fitted to the conduction means.

According to the invention of the first aspect, at the time of molding a disc substrate by using the mold, even when the heat of the molten molding material injected into the conduction path of the conduction means fitted to the one mold body is transmitted within the conduction means, the heat is suppressed from being transmitted to the one mold body by the first heat suppressing means which is disposed between the conduction means and the one mold body. Thus, the one mold body is prevented from being heated to a temperature higher than that of the other mold body, so that there does not arise any asymmetry of residual stresses that becomes a cause of the warp of the injection-molded substrate.

The invention of a second aspect is arranged, in the arrangement of the first aspect, in a manner that a second heat suppressing means is disposed at a position opposing to the first heat suppressing means on other mold body side of the pair of mold bodies.

According to the invention of the second aspect, at the time of molding a disc substrate by using the mold, even when the heat of the molten molding material injected into the conduction path of the conduction means fitted to the one mold body is transmitted within the conduction means, the heat is suppressed from being transmitted to the one mold body by the first heat suppressing means which is disposed between the conduction means and the one mold body. Further, the heat is also suppressed from being transmitted to the other mold body by the second heat suppressing means which is disposed at the position opposing to the first heat suppressing means on the other mold body side. Thus, there does not arise asymmetry of residual stresses that becomes a cause of the warp of the injection-molded substrate.

DETAILED DESCRIPTION OF THE PREFERRED EMBODIMENTS (Mode for Carrying Out the Invention)

Figure 1:
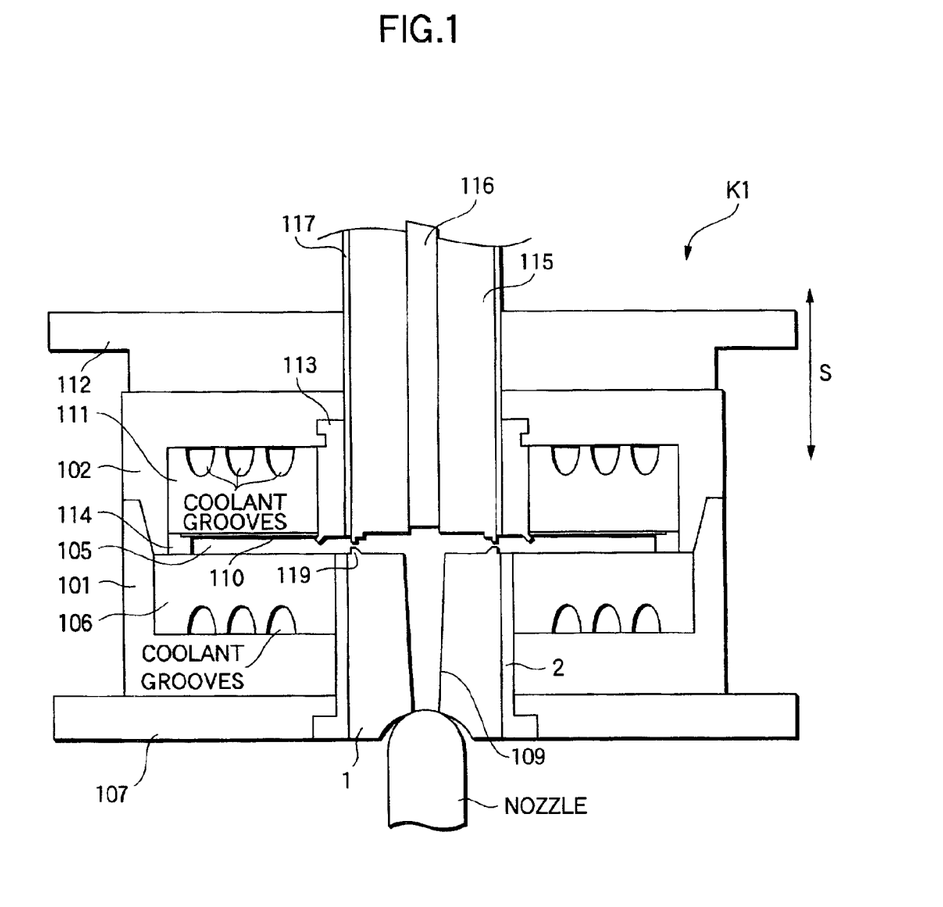
FIG. 1 is a sectional view showing the schematic configuration of the mold K1 of an injection molding apparatus for molding a disc substrate according to the first embodiment of the invention.

The respective preferred embodiments of the invention will be explained with reference to the accompanying drawings. FIG. 1 is a sectional view showing the schematic configuration of the mold K1 of an injection molding apparatus for molding a disc substrate according to the first embodiment of the invention.

In the respective constituent elements of the mold K1 of the injection molding apparatus shown in FIG. 1, the constituent elements having the similar functions as those constituting the mold K0 of the injection molding apparatus shown in FIG. 4 are marked with the same references and the detailed explanation thereof is omitted.

In FIG. 1, the mold K1 is configured by replacing the spool bush 108 of the respective constituent elements of the mold K0 by a spool bush 1.

The spool bush 1 as a conduction means for conducting molten molding material within a mold space 105 from the outside of the mold is configured in a tubular shape. Like the spool bush 108, the spool bush 1 is provided at the inner portion thereof with a spool 109 serving as a conduction path for conducting the molten molding material injected from the outside within the mold space 105.

Further, like the conventional spool bush 108, the spool bush 1 is configured in a manner that the peripheral portion of the spool 109 is formed by metal material of SUS system, for example. Furthermore, as shown in FIG. 1, at the portion of the spool bush abutting against the fixed mold mirror surface board 106 (the outer peripheral portion of the spool bush seen from the spool 109), an annular ring 2 serving as a first heat suppressing means is provided which is formed by material (medium) of ceramic system, for example, and has a coefficient of thermal conductivity smaller than that of the material (medium) of the conventional spool bush 108.

The spool bush 1 is attached and fixed to the fixed mold mirror surface board 106 so as to penetrate the center of the fixed mold mirror surface board 106 to thereby be fitted to a fixed mold body 101. Thus, the mold space 105 is communicated with the external portion through the spool 109, and the annular ring 2 is disposed between the fixed mold body 101 and the spool bush 1.

Since the mold K1 is configured in the aforesaid manner, at the time of the injection molding of the disc substrate using the mold K1, even if heat sequentially radiated from the molten molding material is transmitted within the spool bush 1 when the molten molding material injected from a nozzle passes within the spool 109, the heat can be suppressed from being transmitted to the fixed mold mirror surface board 106 and an attachment mold board 107 due to the operation of the annular ring 2.

Next, the operation of the injection molding apparatus using the mold K1 will be explained.

First, coolant is injected into the coolant grooves of the fixed mold body 101 and the movable mold body 102. Then, each of the fixed molding body and the movable molding body is preliminarily heated to a predetermined temperature (for example, about 110° C.) equal to or lower than the heat deformation temperature of the molten molding material.

When the mold K1 is preliminarily heated, the fixed molding body and the movable molding body are subjected to the mold clamping to thereby form the mold space 105. Then, as an injection process, the pressurized molten molding material is injected into the fluid path from an injection mechanism coupled to the spool 109 of the spool bush 1 to thereby fill the molten molding material within the mold space 105.

In this case, since the outer peripheral portion of the spool bush 1 abutting against the fixed mold mirror surface board 106 is formed by the annular ring 2 with a small coefficient of thermal conductivity, in the injection process, the heat radiated from the molten molding material sequentially injected into the spool 109 from the nozzle of the injection mechanism is suppressed in the transmission, so that the heat is scarcely transmitted to the fixed mold mirror surface board 106. That is, the fixed mold mirror surface board 106 is hardly heated by the heat transmitted through the spool bush 1.

Thus, the molten molding material conducted within the mold space 105 through a runner and a gate flows uniformly between the fixed mold mirror surface board 106 and the movable mold mirror surface board 111 preliminarily heated uniformly from the inner peripheral side to the outer peripheral side radially and filled therein. Therefore, the molten molding material is cooled and solidified while being filled within the mold space 105 with almost symmetrical heat distribution with respect to the center portion between the opposite surfaces of the substrate at each sectional portion thereof.

In this case, since the transmission of the heat of the molten molding material filed within the spool 109 is suppressed by the annular ring 2, the molten molding material within the mold space 105 is cooled uniformly while maintaining the symmetrical state of the heat distribution thereof.

As described above, the molten molding material filled within the mold space 105 is formed in a disc shape on which the pit shapes of the stamper 110 are transferred. Then, the center hole portion of the solidified substrate is pulled out by the operation of the cutting mechanism to form the center hole of the disc substrate. In this manner, the disc substrate is formed.

The residual stresses at the respective portions within the disc-shaped molding material just after the molding process are distributed within the substrate in proportion to the heat distribution. Thus, just after the molding process, the disc substrate taken out from the mold K1 is gradually released from the residual stress due to the influence of the relative temperature and the relative humidity with respect to the ambience and so the high-polymer chain thereof shrinks. In this respect, since the residual stresses at the opposite portions on the both surface sides of the substrate are almost symmetrical with respect to the center portion between the opposite surfaces thereof, the residual stresses just after the molding process does not become asymmetrical and so there does not arise any warp on the disc substrate. Further, since the temperature distribution on the mirror surface board can be made uniform, it is possible to reduce double refraction.

According to the first embodiment, the annular ring 2 is formed, at the outer peripheral potion of the spool bush 1 contacting to the fixed mold mirror surface board 106, as the first heat suppressing means formed by the material of ceramic system with a small coefficient of thermal conductivity. Thus, the embodiment is arranged in a manner that at the time of the injection molding of the disc substrate, the heat sequentially radiated from the molten molding material when the molten molding material injected from the outside of the spool 109 passes within the spool 109 is suppressed from being transmitted to the fixed mold mirror surface board 106 and the attachment mold board 107 by the annular ring 2, whereby the temperature of the mold forming surfaces of the fixed mold body and the movable mold body at the time of the molding process can be held uniformly, and further the heat distribution and the residual stress within the substrate just after the molding process can be prevented from being asymmetric. However, the invention is not limited to the aforesaid configuration, and may be configured in a manner as shown in the following second embodiment, for example, that a second heat suppressing means having the same function as the first heat suppressing means is also provided at the movable mold body side.

Figure 2:
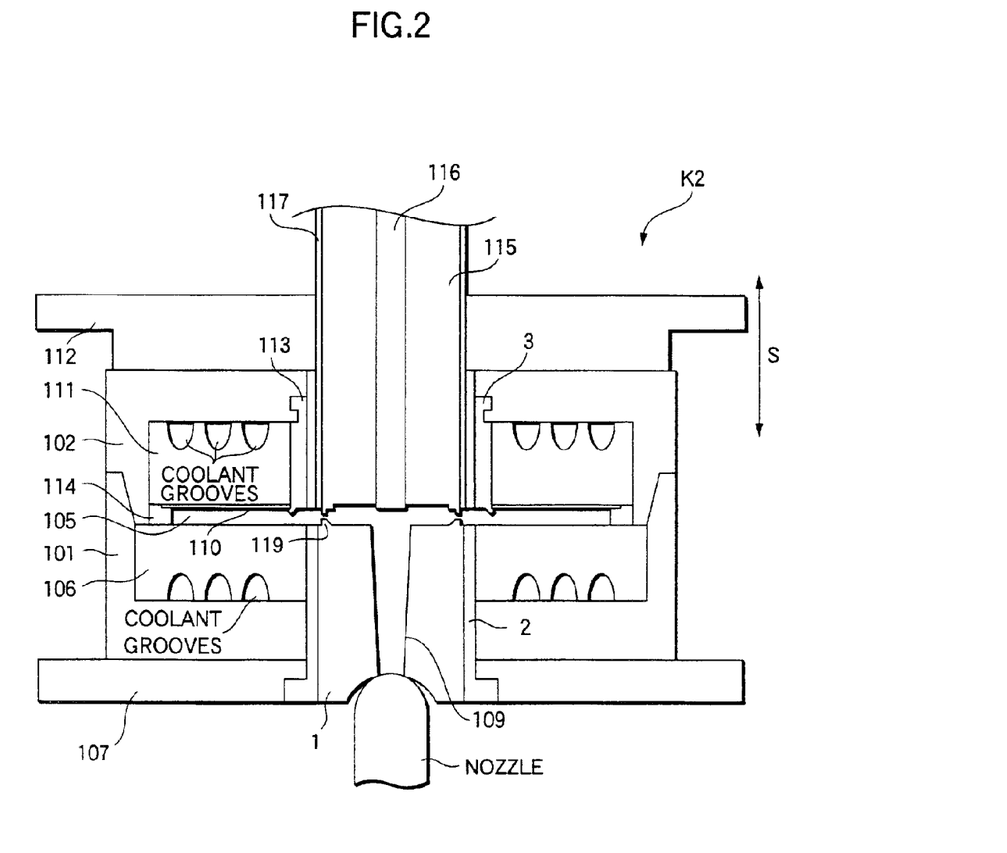
FIG. 2 is a sectional view showing the schematic configuration of the mold K2 of an injection molding apparatus for molding a disc substrate according to the second embodiment of the invention.

FIG. 2 is a sectional view showing the schematic configuration of the mold K2 of an injection molding apparatus for molding a disc substrate according to the second embodiment of the invention.

The mold K2 is arranged in a manner that a portion opposing to the annular ring 2 of the respective constituent elements of the movable mold body 102 of the mold K1 is formed to constitute the second heat suppressing means. In this case, an annular ring 3 is disposed so as to oppose to the annular ring 2 of the mold K1 through a mold space 105 at the almost same radial position as the annular ring 2.

In the aforesaid injection molding process using the mold K1, the annular ring 2 is provided at the outer peripheral side of the spool bush 1 so as to suppress the heat of the molten molding material injected from the spool 109 at each molding process from being transmitted from the spool bush 1 to the fixed mold mirror surface board 106. However, since it is difficult to provide coolant grooves in the cutting mechanism due to the construction thereof, the heat of the molten molding material injected into a runner and a gate is transmitted at each molding cycle. Thus, while the molding processes of the substrates are performed continuously for a long time, heat is accumulated in the cutting mechanism, so that there arises the asymmetrical residual stress after the molding process.

In the mold K2 according to this embodiment, the aforesaid problem is solved by using the annular ring 3 as explained below.

The annular ring 3 is formed by material (medium) of the ceramic system having a coefficient of thermal conductivity which is smaller than that of the cutting mechanism and the releasing mechanism of the mold K2 but larger than the annular ring 2. The annular ring 3 serves to suppress the heat accumulated in the cutting mechanism from being transmitted to the movable mold body 102 at the time of molding the substrate using the mold K2.

In other words, at the time of the injection molding of the disc substrate using the mold K2, when the molten molding material injected from the nozzle passes within the spool 109 and sequentially passes the runner and the gate, the molten molding material abuts against the respective tip end portions of a punch 115, an eject pin 116 and an ejector 117. Thus, the heat of the molten molding material transmitted to these members is suppressed from being transmitted to an inner peripheral clamp 113 as a part of the movable mold body 102 positioned at the outer peripheral side of the annular ring 3.

Since the mold K2 is configured in the aforesaid manner, at the time of molding a substrate by using the mold K2, like the aforesaid case using the mold K1, the heat radiated from the molten molding material sequentially injected into the spool 109 from the nozzle of the injection mechanism in the injection process at each molding cycle is suppressed from being transmitted by presence of the annular ring 2. Thus, the heat is scarcely transmitted to the portion of the fixed mold mirror surface board 106 contacting to the annular ring 2.

As for the molten molding material injected into the spool 109 at each molding cycle, a pat of the heat radiated therefrom is transmitted within the bus 1. Further, after the molten molding material sequentially moves within the runner and the gate, a part of the remaining heat of the molten molding material is transmitted from the respective tip end portions of the punch 115, the eject pin 116 and the ejector 117 to the inside thereof. As the number of the substrates having been continuously molded increases, the heat is accumulated in the punch 115, the eject pin 116 and the ejector 117, that is, the cutting mechanism of the mold K2, so that the temperature of the cutting mechanism increases. However, as shown in FIG. 2, the annular ring 3 provided between the ejector 117 and the inner peripheral clamp 113 can suppress the heat thus accumulated in the cutting mechanism from being transmitted to the inner peripheral clamp 113.

In the aforesaid respective embodiments, the explanation has been made that each of the annular ring 2 serving as the first heat suppressing means and the annular ring 3 serving as the second heat suppressing means is made of material of the ceramic system having the coefficient of thermal conductivity smaller than that of the material of the conventional spool bush 108. However, each of these annular rings may not be necessarily made of the material of the ceramic system but may be made of the material such as heat-resistance resin etc. of polyimide system.

Each of the first heat suppressing means and the second heat suppressing means may be arranged in a manner that the annular ring formed by the aforesaid material includes a vacuum portion therein.

The aforesaid first embodiment is arranged in a manner that the annular ring 2 serving as the first heat suppressing means is disposed between the spool bush 1 and the fixed mold body 101 in which the spool bush 1 serving as the conduction means is fitted, so that the heat radiated from the molten molding material injected into the spool 109 sequentially from the nozzle of the injection mechanism at the time of the injection molding of the disc substrate is suppressed from being transmitted to the fixed mold body 101 from the spool bush 1. Thus, the heat distribution of the fixed mold body and the movable mold body having been subjected to the mold clamping at the time of the molding process can be made symmetric with respect to the mold space 105. However, in the first embodiment, the mold may be arranged in a manner that, in place of the annular ring 2, a molding space having almost the same volume as the spool 109 is provided at the portion of the movable mold body 102 side opposing to the spool bush 1. In this case, the heat distribution of the fixed mold body and the movable mold body having been subjected to the mold clamping at the time of the molding process can also be made symmetric with respect to the mold space 105.

An example of such a mold will be explained with reference to FIG. 3.

Figure 3:
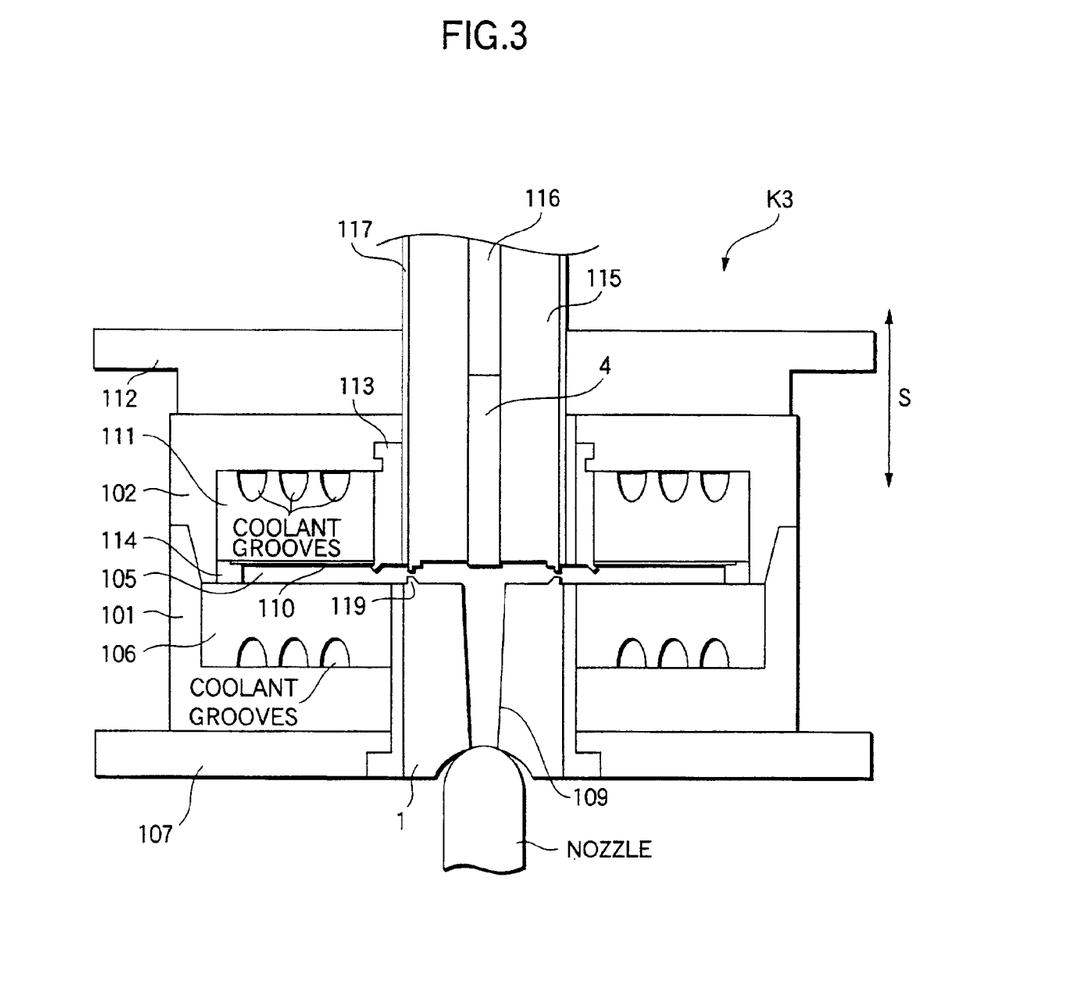
FIG. 3 is a sectional view showing the schematic configuration of the mold K3 of an injection molding apparatus for molding a disc substrate.

FIG. 3 is a sectional view showing the schematic configuration of a mold K3 of an injection molding apparatus for molding a disc substrate. As shown in this figure, the mold K3 is arranged in a manner that the annular ring 2 of the respective constituent elements of the mold K2 is removed and a molding space 4 is added. The molding space 4 is provided at the portion of the movable mold body 102 side opposing to the spool 109 and has almost the same volume as the spool 109. The molding space is coupled to the spool 109 through a runner. As exemplarily shown in FIG. 3, the molding space 4 is formed by a space surrounded by the inner wall of an annular punch 115 and the tip end portion of an eject pin 116.

Since the mold K3 is configured in the aforesaid manner, when the molten molding material is sequentially injected into the spool 109 of the mold K3 from the nozzle of an injection mechanism at the time of the molding process of a disc substrate, the molten molding material is filled into the spool 109 and, simultaneously, the molten molding material of almost the same volume as that filled in the spool 109 is filled into the molding space 4. Thus, the heat of the molten molding material within the spool 109 and the heat of the molten molding material within the molding space 4 is respectively transmitted to the fixed mold body 101 and the movable mold body 102 with the similar heat distribution, so that the heat distribution of the fixed mold body and the movable mold body at the time of the molding process can also be made symmetric with respect to the mold space 105.

In each of the aforesaid embodiments, although the explanation has been made exemplarily as to the mold for forming a pit sequence on a disc substrate, the invention is also can be applied to a mold for forming pregrooves on a disc substrate in the similar manner.

(Effects of the Invention)

As described above, according to the invention of the first aspect, since the first heat suppressing means suppresses the heat of the molten molding material from being transmitted to the mold body, the degree of asymmetry of the heat distribution between the pair of mold bodies of the mold can be reduced. Thus, the degree of asymmetry of the residual stresses which is a cause of the warp of the injection-molded substrate can be reduced. Further, since the temperature distribution on the mold forming surface can be made uniform, it is possible to reduce double refraction.

According to the invention of the second aspect, at the time of molding a disc substrate by using the mold, the heat of the injected molten molding material is suppressed from being transmitted to the one mold body by the first heat suppressing means which is disposed between the conduction means and the one mold body, and further, the heat is also suppressed from being transmitted to the other mold body by the second heat suppressing means which is disposed at the position opposing to the first heat suppressing means on the other mold body side. Thus, since the temperature distribution becomes almost uniform between the two mold bodies, there does not arise asymmetry of residual stresses that becomes a cause of the warp of the injection-molded substrate.

As a result, as for the disc substrate, the warp is prevented from being caused just after the molding and further the warp is prevented from being increased with the time lapse after the molding.

What is claimed is:

1. A mold for injection molding of a disc substrate comprising:
   a pair of mold bodies which are disposed in a manner that circular-shaped mold forming surfaces thereof are opposed to each other to form a disc-shaped mold space therebetween,
   a conduction member which is fitted to a first of said pair of mold bodies so as to communicate with outside through a conduction path for conducting molten molding material injected from outside into said disc-shaped mold space, wherein said mold is provided with a molding space for suppressing heat within said conduction path from being transmitted to said first of said pair of mold bodies disposed at a portion of a second of said pair of mold bodies opposite said conduction member, and said molding space has the same volume as said conduction member.

2. A mold for injection molding of a disc comprising:

a pair of mold bodies which are disposed in a manner that circular-shaped mold forming surfaces thereof are opposed to each other to form a disc-shaped mold space therebetween;

a conduction member which is fitted to a first of said pair of mold bodies so as to communicate with outside through a conduction path for conducting molten molding material injected from outside into said disc-shaped mold space;

a first heat suppressing member for suppressing heat within said conduction path from being transmitted to said first of said pair of mold bodies is disposed between said conduction member and said first of said pair of mold bodies fitted to said conduction member; and a second heat suppressing member at a position opposing to said first heat suppressing member on a second mold body side of said pair of mold bodies, wherein said second heat suppressing member is formed by material of a ceramic system having a coefficient of thermal conductivity which is smaller than that of a cutting mechanism and a releasing mechanism of the mold but larger than that of said first heat suppressing member.

3. A mold for injection molding of a disc comprising:

a pair of mold bodies which are disposed in a manner that circular-shaped mold forming surfaces thereof are opposed to each other to form a disc-shaped mold space therebetween;

conduction means which is fitted to a first of said pair of mold bodies so as to communicate with outside through a conduction path for conducting molten molding material injected from outside into said disc-shaped mold space;

first heat suppressing means for suppressing heat within said conduction path from being transmitted to said first of said pair of mold bodies disposed between said conduction means and said first of said pair of mold bodies fitted to said conduction means; and second heat suppressing means at a position opposing to said first heat suppressing means on a second mold body side of said pair of mold bodies, wherein said second heat suppressing means is formed by material of a ceramic system having a coefficient of thermal conductivity which is smaller than that of a cutting mechanism and a releasing mechanism of the mold but larger than that of said first heat suppressing means.

* * * * *